US010422534B2

(12) United States Patent
Teets

(10) Patent No.: US 10,422,534 B2
(45) Date of Patent: Sep. 24, 2019

(54) FUEL AIR PREMIX CHAMBER FOR A GAS TURBINE ENGINE

(71) Applicant: Joseph Michael Teets, Hobe Sound, FL (US)

(72) Inventor: Joseph Michael Teets, Hobe Sound, FL (US)

(*) Notice: Subject to any disclaimer, the term of this patent is extended or adjusted under 35 U.S.C. 154(b) by 502 days.

(21) Appl. No.: 13/986,905

(22) Filed: Jun. 17, 2013

(65) Prior Publication Data

US 2014/0366542 A1    Dec. 18, 2014

Related U.S. Application Data

(62) Division of application No. 11/820,427, filed on Jun. 19, 2007, now Pat. No. 8,701,416.

(60) Provisional application No. 60/816,404, filed on Jun. 26, 2006.

(51) Int. Cl.
| | |
|---|---|
| *F23R 3/28* | (2006.01) |
| *F23D 11/38* | (2006.01) |
| *F23D 14/64* | (2006.01) |
| *F23R 3/34* | (2006.01) |
| *F23R 3/58* | (2006.01) |

(52) U.S. Cl.
CPC .............. *F23R 3/286* (2013.01); *F23D 11/38* (2013.01); *F23D 14/64* (2013.01); *F23R 3/346* (2013.01); *F23R 3/58* (2013.01)

(58) Field of Classification Search
CPC ...... F02C 7/22; F23R 3/04; F23R 3/10; F23R 3/12; F23R 3/20; F23R 3/283; F23R 3/286; F23R 3/30; F23R 3/32; F23D 11/102; F23D 11/103; F23D 11/38; F23D 11/383; F23D 11/40; F23D 14/02; F23D 14/62; F23D 14/64; F23D 14/78
See application file for complete search history.

(56) References Cited

U.S. PATENT DOCUMENTS

| | | | | |
|---|---|---|---|---|
| 2,621,477 A | * | 12/1952 | Powter | F23R 3/26 236/104 |
| 4,050,238 A | * | 9/1977 | Holzapfel | F23R 3/30 431/116 |
| 5,133,192 A | | 7/1992 | Overton | |
| 5,156,002 A | * | 10/1992 | Mowill | F23R 3/34 60/738 |

(Continued)

FOREIGN PATENT DOCUMENTS

| | | | | |
|---|---|---|---|---|
| WO | WO8803249 | * | 5/1988 | ............ F23D 11/005 |

OTHER PUBLICATIONS

Arthur Lefebvre, Gas Turbine Combustion 2nd Edition, pp. 220 221 222 223 224 225 226 227.

*Primary Examiner* — Andrew H Nguyen
(74) *Attorney, Agent, or Firm* — Daniel S. Polley, P.A.

(57) ABSTRACT

An improved fuel air premix chamber for a gas turbine engine. An integral heat exchange structure is used to cools the premix chamber outer wall, preheating the compressor air supply as it passes into an inner central longitudinal premix tube and preheating also the fuel and F/A mixture for an improved mix, low emissions combustion and low differential combustor pressure. The F/A premix flow thru the central longitudinal tubes and yields an exiting spouting velocity into the primary combustion zone for swirl/circumferential flow combustion yielding flame stability.

16 Claims, 5 Drawing Sheets

SECTION AA

(56) References Cited

U.S. PATENT DOCUMENTS

| | | |
|---|---|---|
| 6,698,208 B2 | 3/2004 | Teets |
| 2004/0134194 A1* | 7/2004 | Roby .................. F02C 3/24 |
| | | 60/750 |

* cited by examiner

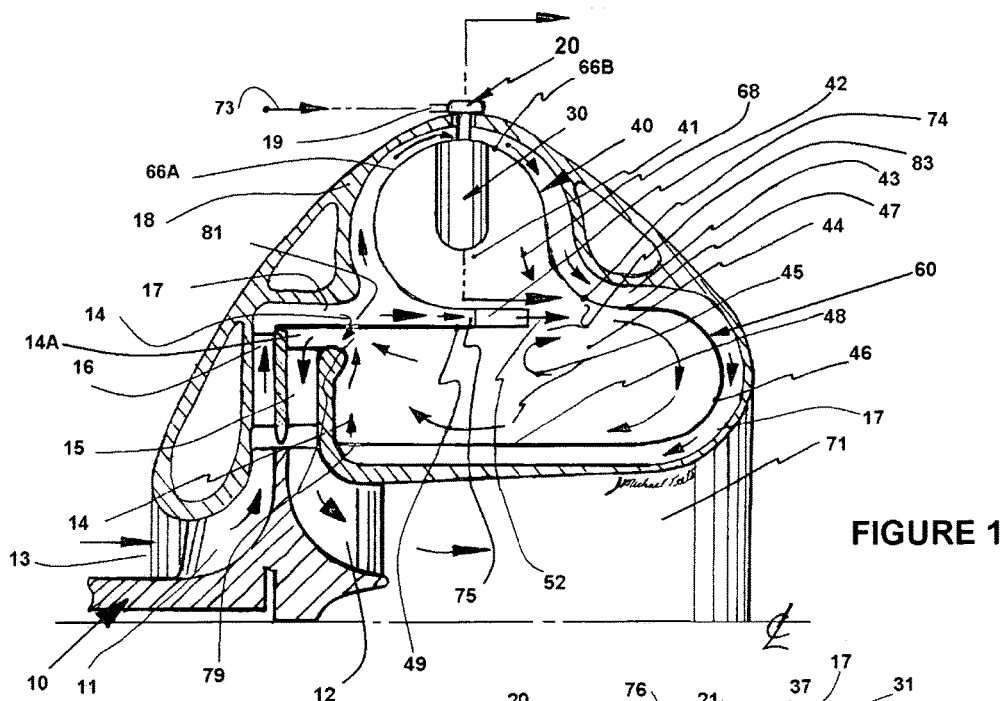
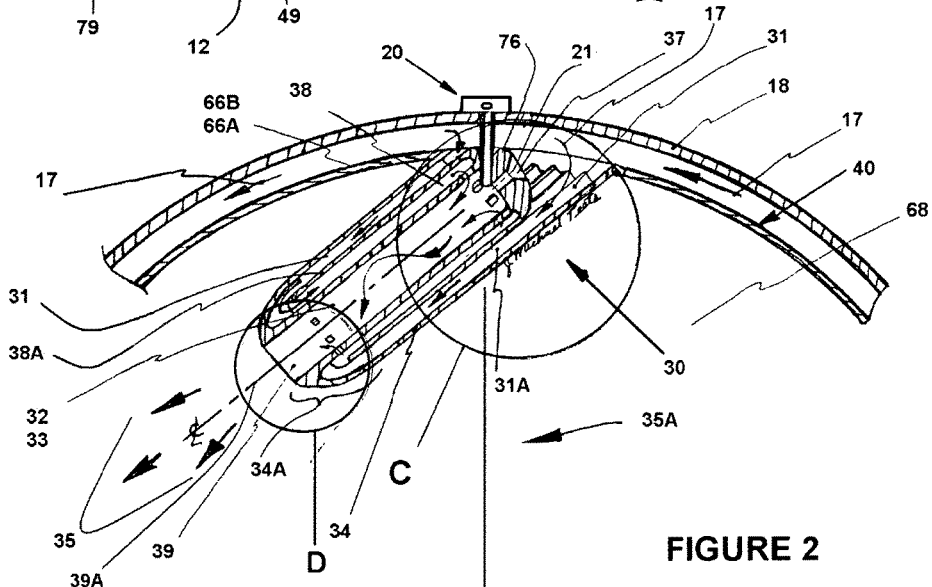
FIGURE 1
FIGURE 2
SECTION AA

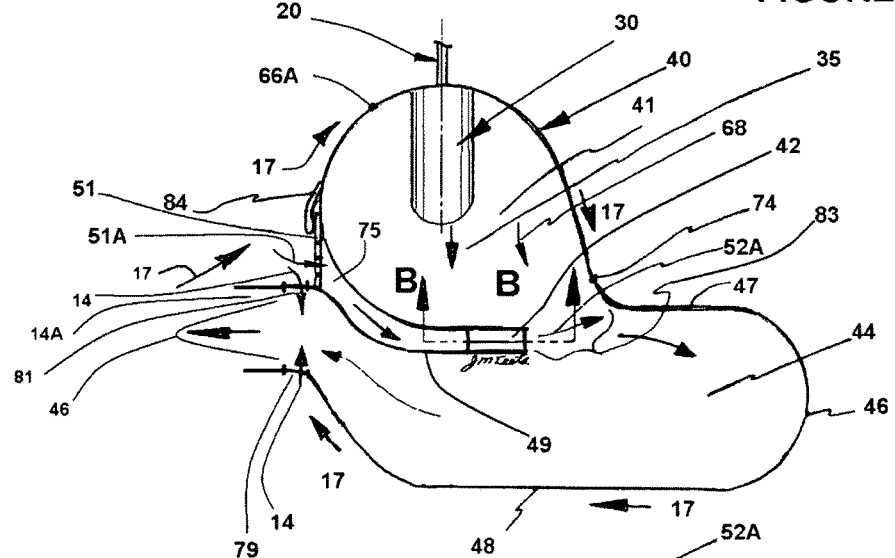
FIGURE 4
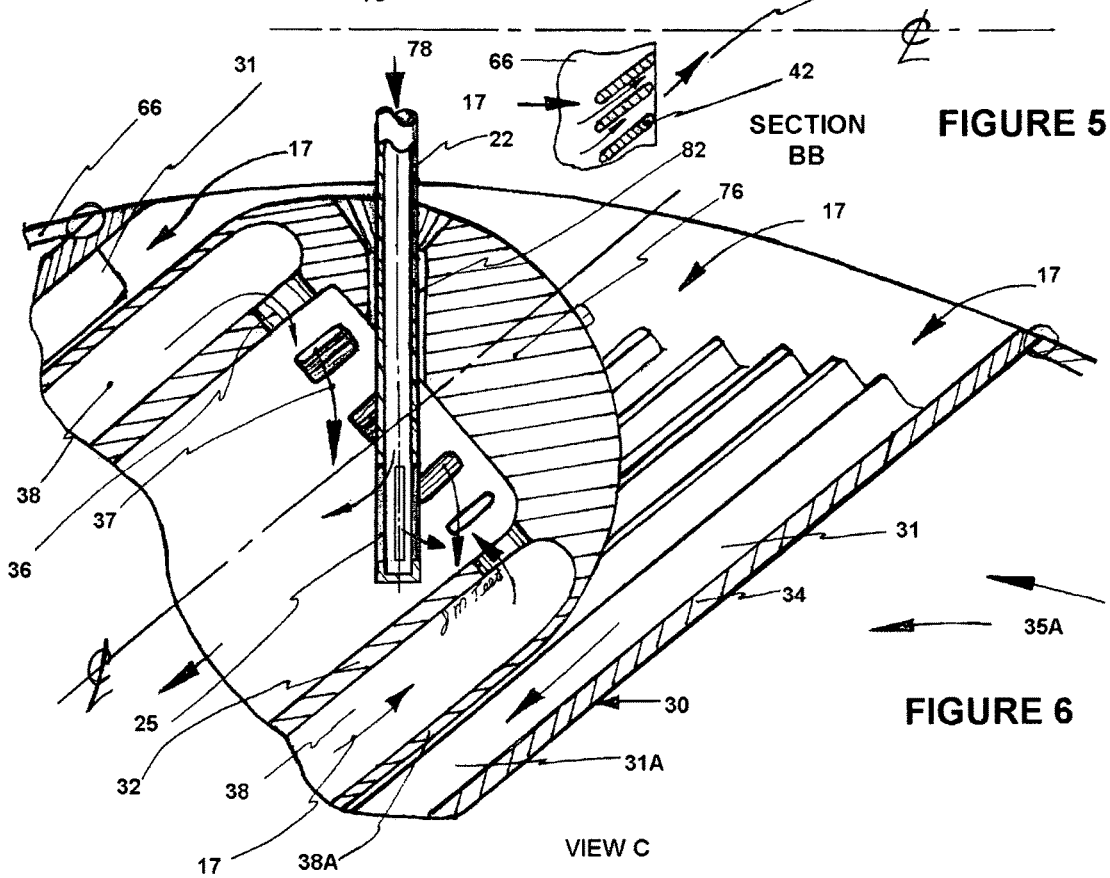
FIGURE 5
FIGURE 6

VIEW C

VIEW D

SECTION EE

FUEL AIR PREMIX CHAMBER FOR A GAS TURBINE ENGINE

This application is a Divisional Application of U.S. application Ser. No. 11/820,427, filed Jun. 19, 2007 which application claims the benefit of and priority to U.S. Provisional Patent Application Ser. No. 60/816,404, filed Jun. 26, 2006. Both applications are incorporated by reference.

BACKGROUND OF THE INVENTION

Field of the Invention

This invention relates generally to RQL combustors and more specifically it relates to a radially staged RQL combustor with tangential fuel/air premix chambers as an internal combustion energy means for a gas turbine engine to yield low emissions, good flame stability, uniform flame front, mulifuel use including low BTU gas, and good flame stability at any power setting.

Description of Prior Art

It can be appreciated that RQL combustors have been in use for years. Typically, low emissions combustors used in gas turbine engines for Dry Low Emissions (DLE) and are either Lean Premixed Prevaporized (LPP) type or Rich burn-Quick quench-Lean burn (RQL) type using liquid or gaseous fuels; the combustors operate with a continuous flame and incorporate fuel nozzle assemblies to accept and premix amounts of regulated deliver fuel and air to yield a flammable mixture for the heat energy means to drive the gas turbine rotor spool. Features of a good combustor include: flame stability, low emissions, little or no soot, and high combustion efficiency over a wide range of engine power requirements and operating engines rotational speeds.

The main challenge with a combustor is controlling combustion flame temperature which by most part dictates emissions species levels of NOx (oxides of nitrogen, NO+NO2), CO (carbon monoxide) and UHC (unburned hydrocarbons). Conventional combustors of today for gas turbine engines have flame temperatures between ~1340 F and 4050 F (dependant on fuel type); the lower flame temperature yields low NOx but excessive CO, UHC and the higher flame temperatures yield both low CO and UHC but higher flame temperatures yielding excessive NOx. Acceptable low levels of these emissions species could be found between flame temperatures operating range of 2400 F and 2800 F in a air rich, lean combustion F/A ratio environment. To attain this approximate narrow band of flame temperatures, variable geometry means to the air supply could be incorporated but would add complexity in hardware control methods and maintenance yielding an increase of cost. Of the various means of variable geometry for a LPP combustor system, would be one in which large quantities of engine air are admitted at the upstream end of the combustion liner at maximum power conditions to lower the primary-zone temperature thru lean F/A mixtures. With reduction in engine power, an increasing proportion of the air would be diverted to the downstream dilution zone to maintain a lean F/A mixture within the low emissions (NOx, CO, UHC) flame temperature window/range. U.S. Pat. Nos. 5,894,720 and 5,966,926 LPP type combustors offer low emission at high end power level and incorporates staged premix fuel/air nozzles to assist in the reduction of emission at off design power-or reduced power requirements and aide in the combustion flame stability, but too lean of a F/A ratio would cause combustor flame extinction. The fuel/air premix nozzles of these noted LPP patents are positioned in the forward end of the combustor and direct pre-combustor exiting combusted gases into an annular combustor liner in a tangential direction for flame dispersion and stabilization assist. The fuel/air premix nozzles, incorporate combustor liner expansion means for the engine body fixed nozzle assemblies. Another means of reduced emissions thru LPP combustor design is seen in the ABB EV burner noted in ASME 99-GT-21B publication.

This offers low emissions over a wide range of power requirements and incorporates a pilot fuel nozzle system to assure flame stability of the LPP flame at off design, reduced engine power conditions and during transient power operation.

Another issue with conventional combustors are fuel nozzle premix systems, the fuel/air mixtures prior to combustion ideally should be homogeneous, features of good mixedness; and concerning liquid fuels, a preheating fuel process to yield a gaseous state would be helpful to enhance mixedness in the F/A mixing process. Whittle in early years of gas turbines ~1936 attempted to use fuel delivery in tubes within the combustor to vaporize fuel prior to combustion but had inner tube wall carbon issue. Rolls Royce, Curtis-Wright, Avco Lycoming, Snecma and Williams to name a few have successfully incorporated premix vaporizer tubes in gas turbine engines with different ranges of F/A mixture prior to combustion some rich enough not to support combustion within the premix tubes. Most use clean Jet fuels whereas diesel type fuels have a propensity not only to cause coke between ~283 F to 800 F like Jet fuels but at higher temperatures, ash deposits blockage will be an issue if the fuel nozzle geometry is not designed properly. Another problem with conventional RQL type combustors with the primary zone rich F/A combustion and lean secondary combustion zone is the need to have good mixedness prior to combustion but less sensitive than the LPP combustor. Also, in the secondary combustion zone (RQL)a uniform quick quench mixing premix process of the rich oxidizing primary flame for the lean stage secondary flame is necessary having continuous fluid flow uninterrupted thru the secondary zone chamber with no stagnation area and or no f/a leanings stray air injection to add NOx. Rizk and Mongia in a 1992 paper on RQL combustors noted equivalence ratios (ER=actual F/A ratio divided by the F/A ratio of the unique fuel level stoichiometry) in the primary zone of 1.2 to 2.5 and tested and included liquid (limited <1.6) and gaseous fuels F/A ratio was highest at maximum power and was limited to avoid any hard carbon and subsequent turbine ingestion issue. The secondary mixing area of the can combustor (like U.S. Pat. No. 4,787,208 without variable geometry) had a typical reduced area to assist mixing of the jetted supply air for immediate leaning of the supplied rich flame primary oxidizing stage flame (typically high radiant red color for diesel type fuel and dark blue for gaseous fuels). The highest flame temperature is ~@ stoichiometry level with decreasing flame temperature as the F/A mixture is richened or leaned. The desired (ER) equivalence ratio for the secondary zone is –0.6 to 0.45. Variable geometry was experimented with in all zones (primary, secondary, and dilution) in the Rizk and Mongia efforts. In the U.S. Pat. No. 4,996,838 of 1991 (RQL type) combustor idea considered variable residence time vortex with liner wall louvers in the annular combustor and a reduced geometry between the primary and secondary chambers and radially opposing air jets for secondary air supply/mixing was incorporated. The AIAA 92-3471 in 1992 reflected some test results including ~1.77 equivalence ratio (ER) in the primary zone and 0.6 (ER) in the secondary zone. The louvers most likely were added to rid liner wall carbon (wall stagnation flow and or raw fuel onto the liner wall yielding hard carbon) and with this added leaning air in the rich primary zone elevated NOx would ensue. June 1992 of Mechanical Engineering Magazine engine testing of a RQL liner using coal having a rich flame primary zone flame of ER ~1.77 (~3000 F) and the secondary flame was water quenched to −2000 F to help rid the coal ash along with low NOx. The U.S. Pat. No. 4,702,073 describes a vortex combustion process type can combustor having a reduced geometry section between the primary and secondary chambers having channel vanes of opposing air jets to continue to drive a vortex process, was especially helpful in collection of ash particles being radially outboard and duct out of the engine. U.S. Pat. No. 5,363,644 depicts a sidewinder combustor annular design and could be used as an RQL application but limited in use. The primary zone with circumferential tangent tube for fuel/air premix supply, as nozzles would have F/A unmixedness at high power levels yielding pockets of elevated flame temperature, and the louvers/internal plates added would yield elevated flames temperature pockets if a rich F/A mixture was adjacent to the louvers. The second row of tangent air supply tubes downstream continue the combustion leaning process; but if air in injected into the supplied rich primary flame the mixedness locally would be less than uniform and yield resultant elevated flame temperatures and subsequent higher levels of NOx emissions. This patent is an upgrade from the conventional combustors to a RQL type. U.S. Pat. No. 6,845,621 a RQL combustor, having an initial design thru empirical methods via the author, offers good low emissions with gaseous fuel; and with the incorporation of U.S. Pat. No. 6,698,208 atomizing fuel nozzles, reduced emissions using liquid fuel could be exhibited thru improved F/A premix mixedness in the primary zone but needs a higher delta P across the combustor liner for atomizing/vaporizing as that of gaseous fuel. Analytics show the combustor could yield single digit NOx levels and CO simultaneously. Although the secondary air of supply in U.S. Pat. No. 6,845,621 yields a good quench zone having reduced area in the form of radial dams with radial opposing air supply jets axially located between the primary zone and secondary combustion chambers—the areas, downstream of and adjacent to the dam wall secondary side having stagnation areas and also in the primary zone side if injection of secondary air is possible low NOx levels will be compromised.

In these respects, the Radially Staged RQL Combustor with Tangential Fuel Premixers according to the present invention substantially departs from the conventional concepts and design of prior art, and in so doing provides an apparatus primarily developed for the purpose of providing an internal combustion energy device for a gas turbine engine to yield low emissions, high durability, multifuel use including low BTU gas and good flame stability at any power setting and or engine operating speed.

SUMMARY OF THE INVENTION

In view of the foregoing disadvantages inherent in the known types of RQL combustors now present in the prior art, the present invention provides a new radially staged RQL combustor with tangential fuel premixers construction wherein the same can be utilized for providing a internal combustion energy device for a gas turbine engine to yield low emission, reduced cost, improved durability, mulifuel use including low BTU gas-bio fuels, good flame stability at any power settings and ease of starting. The general purpose of the present invention, which will be described subsequently in greater detail, is to provide a new radially staged RQL combustor with tangential fuel: air premix chambers that has many novel features and result in a new radially staged RQL combustor which is not anticipated, rendered obvious, suggested, or even implied by any of the prior art, either alone or in any combination thereof.

To attain this, the present invention generally comprises a combustor assembly, having a primary combustion zone, secondary air area, a reduced combustor flow area for secondary air supply fuel/air (F/A) premixing, a secondary combustion zone, a dilution air supply area, a dilution zone, fuel injector assemblies, and a tangential supply primary zone located fuel-air premix chambers.

A Rich burn-Quick quench-Lean burn (RQL) combustor having a toroidal form primary combustion zone with tangential fuel-air premix chambers and in general is radially outboard of the secondary combustion chamber.

The fuel-air premix chamber is an elongated tubular form, attached to the outboard primary combustion chamber, receives fuel and air within and premixes a combustible mixture and discharges the mixture tangential with velocity.

The fuel injector is tubular form, is flange retained to the engine body, and with free length is insertable into F/A premix chamber, longitudinal central F/A passageway for delivery of jetted liquid fuel or gaseous type. TMA Power, LLC has successfully tested a premix chamber requiring only 0.5 to 1.5 psig. combustor differential pressure. There has thus been outlined, rather broadly, the more important features of the invention in order that the detailed description thereof my be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways including a LPP combustion application. Also, it is to be understood that the phraseology and terminology employed herein are for the purpose of the description and should not be regarded as limiting. A primary object of the present invention is to provide a radially staged RQL combustor scheme with tangential fuel-air premix chambers that will overcome the shortcomings of the prior art devices.

An object of the present invention is to provide a radially staged RQL combustor with tangential oriented fuel-air premix chambers to provide a internal combustion energy device for a gas turbine engine yielding low emissions, reduced cost, high durability, multifuel use, good flame stability at any power or engine speed setting.

Another object is to provide a radially staged RQL combustor with tangential fuel air premix chambers that improves RQL combustion means, to yield low emission, high combustion efficiency, high turn down ratio capability and has good flame stability throughout the gas turbine engine operating range of engine airflow and engine spool rotational speeds. Another object is to provide a radially staged RQL combustor with tangential fuel air premix chambers that improves fuel preheating means prior to combustion in the primary combustion zone and yield a homogeneous F/A mixture within and yield premix chamber exit flow resultant in a tangential circumferential flow in the primary zone.

Another object is to provide a geometry form in the primary/secondary combustion chambers to lend smooth continuous thru flow without flow disruption, stagnation areas and minimal structural and or thermal stresses.

Another object is to provide a fuel air premixing chambers to rid potential coke formation on the fuel fluid film dispersion wall either thru temperature control and or material selection. Also the fuel air premix chambers fluid residence time increase for improved homogenous F/A mixing is considered with geometry/length and internal swirl velocity. Ceramic material chamber could be incorporated to rid any material reaction with the fuel to rid propensity of attachment such as coke or ash issues. Another object is to provide a radially staged RQL combustor with tangential fuel air premixers having low pressure fuel injection either thru liquid fuel use jetted wall thin film dispersion or injector wall axially slotted thru cavities to allow low pressure gas dispersion within the primary premix chamber to improve F/A mixing prior to combustion.

Another object is to provide a radially staged RQL combustor with tangential oriented fuel-air premix chambers that improves combustor design where the primary combustion zone incorporates a toroidal circumferential flow to keep unburned fuel outboard of the radially inboard primary zone exit flow to the secondary zone; where the radially inboard axial aft exiting primary zone flame flow intersects with the secondary air flow from at least one predominantly axial direction and the radially out board shell wall of the secondary combustion zone to create a combustor flow circumferentially and aft or a combination flow direction. The circumferential primary combustion zone fluid flow and or secondary combustion zone not only could assure unburned fuel being outboard due to higher density and giving more residence time for combustion but a circumferential duct could be incorporated as a means of ash collection in the case of pulverized coal fuel (example) and at scheduled intervals combustor pressure could be used to eject overboard this collected ash.

Other objects and advantages of the present invention will become obvious to the reader and it is intended that these objects and advantages are within the scope of the present invention.

To the accomplishment of the aforementioned and related objects, this invention may be embodied in the form illustrated in the accompanying drawings, attention being called to the fact, however, that the drawing are illustrative only, and that changes my be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1, ¼ cross-section side view, RQL combustor assembly within an engine body.

FIG. 2, Section AA, partial cross section view, RQL combustor with tangential fuel air premixers chambers.

FIG. 4, ½ cross sectional view of the RQL combustor assembly with one secondary air entrance.

FIG. 5, partial cross section of secondary air supply angled vane channels.

FIG. 6, partial cross section of a tangential fuel air premix chamber with a gaseous fuel injector.

DESCRIPTION OF THE PREFERRED EMBODIMENT

Figure 3:
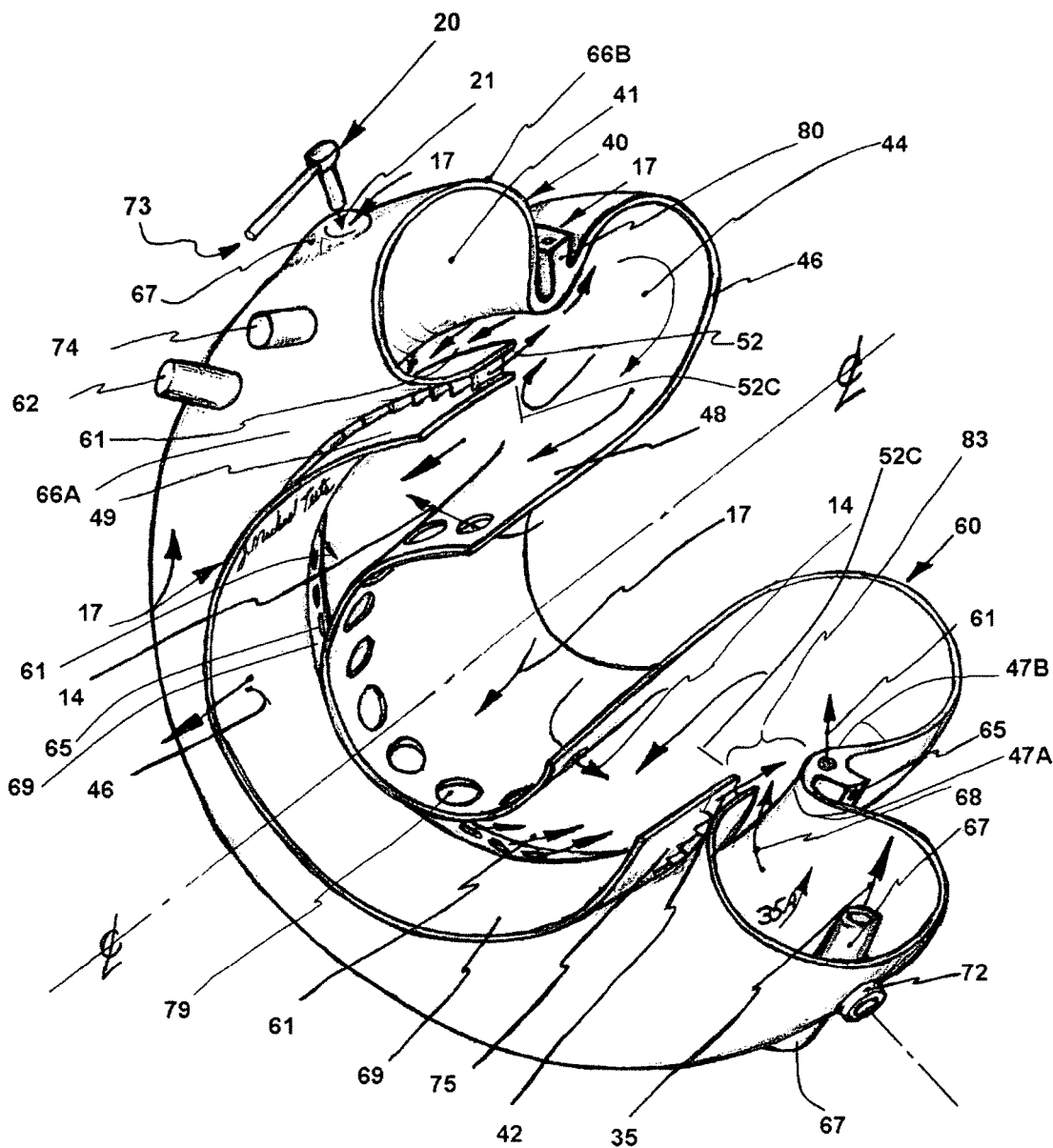
FIG. 3, orthogonal view of a RQL combustor having two secondary air supplies, ¼ section removed.

Turning now descriptively to the drawings, in which similar reference characters denote similar elements throughout the several views, the attached figures illustrate a radially staged RQL combustor assembly with tangential oriented fuel air premix chambers, and comprise of: a primary combustion zone with fuel injection means, tangentially oriented fuel-air premix chambers 30, a secondary air supply area, a reduced combustor flow area to receive secondary air supply for fuel/air premixing, a secondary combustion zone, a dilution air supply area, a dilution zone.

This Rich burn-Quick quench-Lean burn (RQL) combustor invention having a toroidal geometry primary combustion zone with tangential premix chamber 30 is generally positioned radially outboard of the secondary combustion zone 44. The fuel air premix chamber 30 is a longitudinally elongated tubular form assembly having an outer tube 34 with internal cooling means channels 31A a coxial mid tube 38A, an outer tube 34 and a co-axial inboard fluid turning end 34A, air supply 17 entrance end cap 76 end located to the outer circumferential shell position of the primary combustion chamber 40, front and aft forms 66A, 66B. The combustor premix chamber 30, outer tube form 34 is exposed to the primary zone 41 hot gas receives fuel supply 73, 78 thru injectors 20 or 22 and air 17 within and F/A premixes inboard of tube 32, 33 a combustible mixture and discharges at exit 39, with velocity 35 thru a differential combustor liner pressure, into the primary combustion zone 41 tangentially 35A.

To avoid premix chamber entrance carbon at the fuel injection, discharge end, fuel onto the tube ID wall 32, inboard cap 76 area, the air delivery 17 to the premix inboard tube chamber ID 32, an air 17 preheating means thru a counter flow heat exchanger is incorporated. Premix chamber air flow 17 supply begins about the end cap 76 of the mixing chamber proximal end channel 31A entrance, area between the inboard surface of outer tube 34 proximal end, having cooling fins 31 and OD of the mid tube 38A forming, multiple linear channels to remove heat from tube 34 and end form 34A. The heating of air 17 continues to the distal end of the outer tube 34 then inboard at the 34A end wall then with counterflow back to the proximal mixing chamber end cap 76, thru channel 38 area between inner tube 32 outer wall (could have fins to help heat the inner tube 32 wall to vaporize the fuel) and the mid tube 38A inner wall, supplying premixing air 17 to and thru air supply cross channels 36 to yield inner swirl 37 flow.

The end cap 76 inboard side begins the fuel/air mixing area. The air supply cross channels 36 could be elongated axially extending the length of the tube 32 or additionally incorporate circumferential disposed planer cross channels 36A yielding air supply flow 37A downstream toward the exiting tube 32 distal end 39 to assure premixing the fuel/air mixture. The cross channel air supply cross channels 36 and 36A also could be replaced by annular cross flow channel. In the case of liquid fuel, a end cap 76 hole 37 is incorporated for air 17 supply preventing fuel stagnation about the end 24A fuel injector assembly 20, outer wall 23A exit wall 24 A to rid potential coking during operation and or shutdown.

Figure 7:
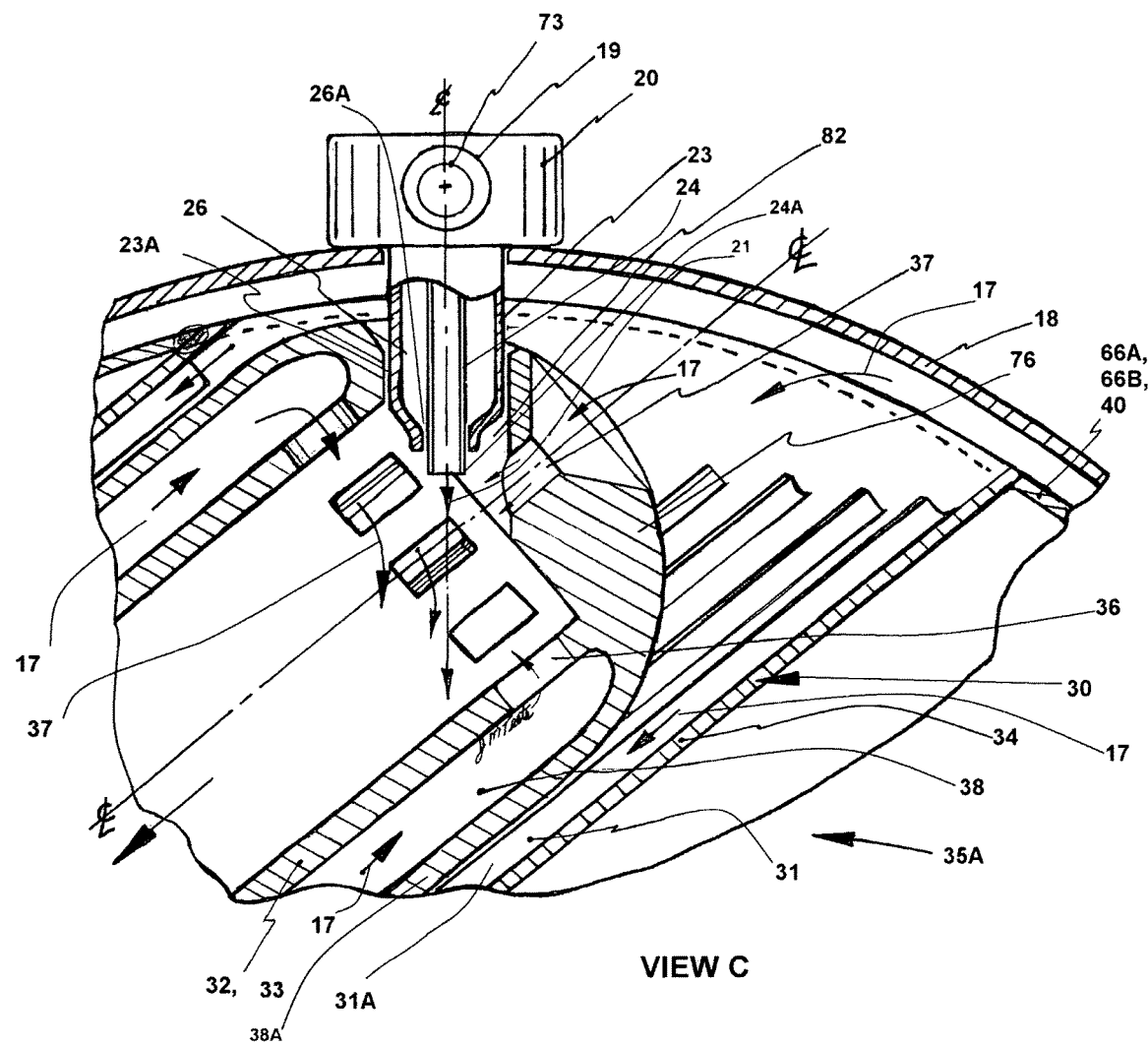
FIG. 7, partial cross section of a Fuel Air premix chamber with a liquid fuel injector assembly.
Figure 8:
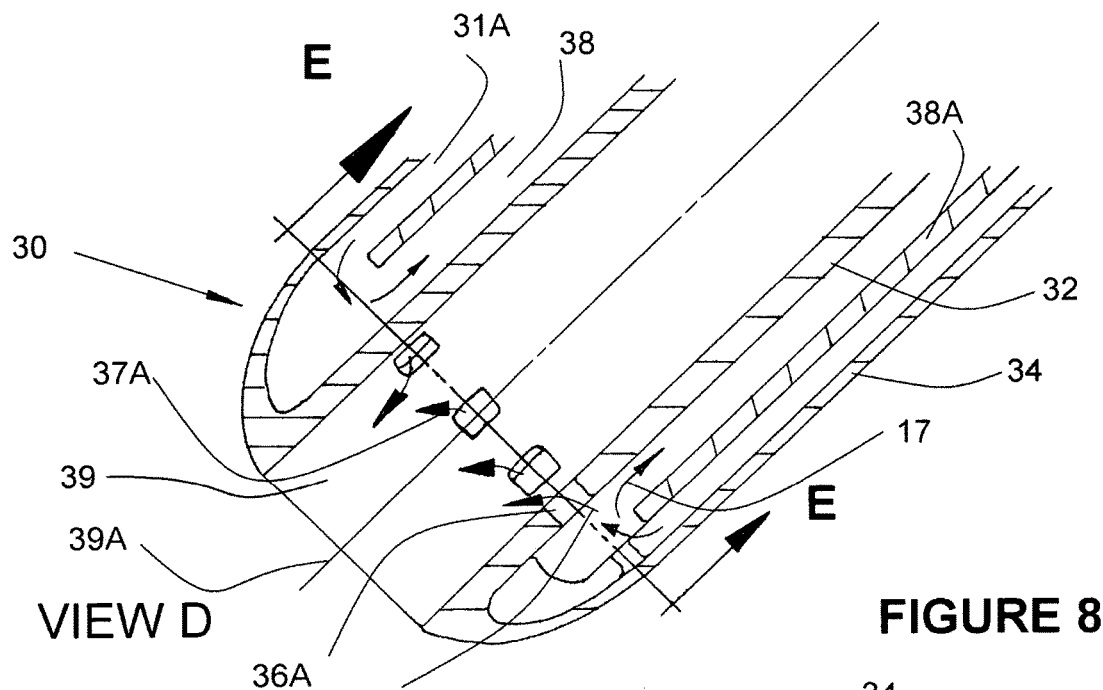
FIG. 8, View D partial cross section of mixing chamber distal end.
Figure 9:
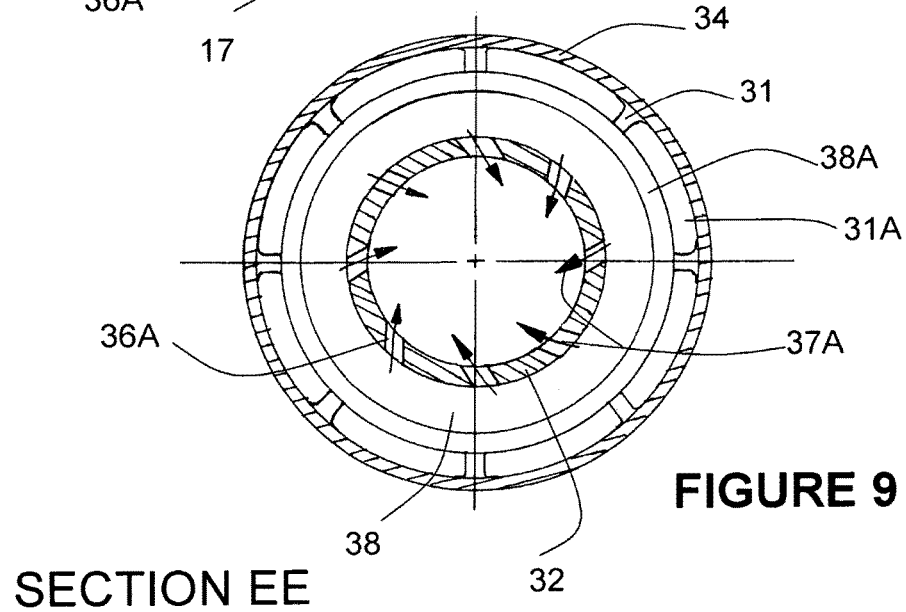
FIG. 9, Cross Section Fuel Air Premixing Chamber distal end area, with air supply cross channels.

The fuel air premix chambers 30 receive jetted fuel 21 such to impart a force for wall 32 tube ID fuel dispersion resultant thin layer of fuel to aid in heating of the fuel, as in the case of liquid fuels. The radially positioned injector 20, receiver hole 82 is incorporated to allow free thermal radial expansion of the combustor liner 40-66A, 66B about the injector assembly 20 or 22 and also retain the insertable inner tube sub assembly 32-76-38A. The inner tube 32, longitudinal central passageway 33 with centerline 39A premixes the F/A mixture within; the length design considers f/a residence time and the cross-section flow area design such to impart an exiting velocity 35 from tube exit area 39 creating a circumferential toroidal flow 35A. The created circumferential tangent primary zone flow 35A assists in keeping raw unburned fuel outboard and away from the primary zone exit area 68 until combusted. For ease of assembly, reduced cost and simplicity the, tube 32 end cap 76 and mid tube 38A as a subassembly is longitudinally, co-axially insertable into the outer tube 34 with end form 34A having one end attached to the liner shell 66A, 66B. The tangential circumferentially spaced premixing tube arrangement assist in flame heating the mixing tubes. The fuel injector assembly 20, FIG. 7 (or a gaseous type 22 simple tube of FIG. 6) is a tubular form, and retained to the engine body 18 about the combustor and with a free length is insertable into the premix chamber 30, end cap 76 inner area for delivery of jetted liquid fuel or gaseous type. The inner tube 32 heated surface ID depending on the fuel type, may generate a residual by-product as in the case of diesel fuel type, react/attach to the metal surface, where a ceramic material insertable tube 33 may be incorporated to rid the issue or a coating of zirconium to the tube 32 ID. Injector heat shield 23 about the injector tube 24 with a free axial joint 26A and close loose fit 23-76 for thermal expansion differences, forming a air insulation gap 26 to help keep the tube 24 temperature below ~280 F to prevent internal coking of fuel 78 on the inner wall. As another f/a premix tube means simple tubes 67 FIG. 3 are attached tangentially to the primary zone toroidal form 66 A, 66B to yield a tangential exit f/a flow 35 exiting velocity with resultant circumferential velocity 35A and could be incorporated as a low cost means but be limited in premixing length of −1.0 inch due to a potential flame on both sides of the metal tube. Like the fuel air premix chamber 30, liquid fuel could be jetted to the inner tube wall for thin film dispersion and with a delta liner pressure the air flow 17 would premix with fuel internally within and carried thru by air flow 17 and could have a simple tube 67 entrance internal coking issue; but more successfully considering gaseous fuels and incorporating injector 22 with exiting longitudinal elongated openings 25. Also as a note, diesel fuels used with material alloy having nickel content, can incur sulfidation at metal temperatures above 1300 F.

A Rich burn-Quick quench-Lean burn (RQL) combustor 40 has a toroidal form primary combustion zone 41 with tangential arranged premix chambers 30 and is radially outboard of a secondary combustion zone 44. The gas turbine combustor assembly 40 of this invention like other combustors involves complex combustion dynamics and evolved by the most part thru empirical means. Material for this combustor must withstand high temperature environments and at times corrosive elements, say from supplied fuel or atmospheric gases. The combustor liner 40 or shell having inner and outer surfaces requires a cooling means and in this invention, uses induced velocity engine compressor air 17 as it is ducted to the designated combustion zones entry areas. The preferred embodiment is represented in FIG. 3 but incorporates fuel air premix chambers assemblies 30 in place of the simple tangent tubes 67 and also are circumferentially displaced about the primary zone 41 outer periphery. In operation, a percentage of gas turbine engine compressor 11 discharge air 17 of FIG. 1 is preheated during transition thru the fuel air premix chambers 30, being ducted to the inner tube 32 longitudinal central passageway FIG. 6, where air supply cross channels 36 as a minimum, proximal end incorporated and are tangentially arranged about the tube 32 to supply air 17 becomes tangential 37 to assure no liquid fluid flow stagnation at the beginning of external fuel pressure injector 22 supplied jetted fuel wall dispersion point on wall 32. The air supply cross channel 36 preferred to be tangential to assure raw liquid fuels centrifugally outward to the longitudinal central passageway tube 32 wall for fuel heating. The air supply cross channels 36 although shown in one plain could be additional in other planer longitudinal positions displaced axially downstream within the fuel air premix chamber tube length and still yield a rich fuel air pre-mixture for primary zone combustion. Also as the f/a mixture within the tube 32 ID, the longitudinal central passageway, becomes flammable in the tube and having no stagnation areas or boundary layer issues, the swirl internal flow velocity will keep the flame 35 outboard of the tube exit area 39. The fuel air premix chamber assembly 30 outer shell 34 incorporate cooling ribs 31 to preheat the delivered air 17 in transit thru channels 31 and 38 and at the same time cools the wall 34 and heat the inner tube wall 32 (some diesel fuel cokes @ 278 F to 800 F fuel and pressure dependent). An inner tube 32 made from ceramic material could be insertable into 33 to rid any heat issue of an internal flame or coke-fuel reaction with metal materials and or ash issues. To assure no fuel stagnation at the end of the injector tube detail 24 fuel exiting end during operation and shut down, air port 37 is incorporated in the fuel air premix chamber assembly 30 entrance end. In the case of a gaseous fuel 78 injector tube 22, FIG. 6, linear/elongated slots 25 are incorporated to allow better fuel dispersions thru flow area consideration to yield better f/a mixing in the fuel air premix chamber 30 tubes 32 longitudinal fuel air central passageway. The combustible fuel/air mixture once ignited an igniter 74 or other means like a "torch" 62, FIG. 3, will supply internal engine heat energy to drive the gas turbine rotor 12 of engine spool 11 FIG. 1. This RQL combustor device offers low emissions, good flame stability at various power loads and or engine speed operating conditions, high combustion efficiency with multifuel usage capability and a uniform flame front to the turbine. Concerning liquid fuels, diesel fuels more-so than gasoline or Jet fuel will have a tendency in the primary combustion zone, depending on f/a mixedness, developed internal toroidal fluid flow and related geometry the f/a richness will be is depicted in FIGS. 2, 3, 5, 6, and 7 with FIGS. 1 and 4 as other alternate configurations. FIG. 3 reflects the preferred combustor 60 embodiment. The primary combustion zone 41 FIG. 3, where fuel rich oxidizing combustion takes place, is of a toroidal form 40 (66A, 66B) and receives a combustible F/A mixture with velocity from the premix chamber 67 FIG. 3 a simple tangent premix tube or fuel air premix chamber 30 of FIG. 2 with an exit area 39 of FIG. 2 and is integrated into the primary zone combustion chamber 41, creating an exiting velocity 35 for a circumferential toroidal flow 35A. This primary combustion chamber 41 of general toroidal geometry 40 and is generally radially outboard of the secondary combustion zone 44 which is of an annular geometry having an inner annular shell 48 and connected to a end wall dome shell 46 radially inboard end and further, the radially outboard end 47 of the shell dome 46 having a longitudinal axial length and connects to an annular inboard end of radially externally positioned annular secondary air flow ring form 80 having internal fluid flow channels 65, direct air flow 17 generally inwardly and circumferentially into the secondary chamber 44. This outer ring form 80, forward side inboard end is attached to the primary chamber 40 aft dome shell wall 66B radially inboard end. The annular reduced area 83 passageway, begins the secondary combustion zone lean-premix-quick-quench premixing area, and is between the primary chamber 41 and secondary chamber 44 that receives the primary zone rich combusted oxidized gases and mixes with the F/A leaning compressor air 17 that passes thru outwardly positioned ring 80, channels 65, inward tangent flow 61 and also simultaneously with additional leaning compressor air 17 is supplied thru channels/vanes 42 with axial direction 52 FIG. 3 and or angular 52A FIG. 5.

The combustor liner walls are cooled by a controlled area ducted compressor air flow 17 velocity as it passes thru and to various combustor primary, secondary and dilution air delivery areas. The secondary zone 44 has lean fuel/air combustion and is of an annular form with volume consideration for longer residence time for reduced temperature CO conversion. The dilution zone 46, downstream of the secondary combustion zone, receives dilution air 14, supplied thru combustor liner 48 openings 79 accepting compressor discharge air 17 to condition the hot combustor gases for the turbine stage requirements. Air can also enter the dilution zone 46 from the annular outer shell 49 from the outer dilution zone duct shell thru holes 81 of FIGS. 1 and 4. The reduced gas temperature 46 is duct transitioned to the turbine nozzle 15 where the hot gas velocity is imparted to the drive the turbine 12 of rotor spool 10 FIG. 1. Structurally the combustor can be located and retained with the engine body 18 either by radial extending bolts thru combustor details 72 of FIG. 3 and or using the engine body retained radially positioned and extended fuel injectors assemblies 20, into the injector radially receiver holes 82 or 21 of end sections 76 in the premix chamber 30.

As yet another combustor inventive form, FIG. 4, RQL combustor assembly 40-60, like FIG. 1 incorporates a primary combustion zone 41 in a general toroidal geometry form 66 A, 66B and radially positioned outboard of the general axial annular secondary combustion zone 44, having an end shell form 46 and at least one end wall or dome 46 connecting the inner shell 48 and outer shell 47 and having a connection transition 74 annular shell between toroidal form 40 (66A, 66B) and the annular section 47. This scheme has secondary leaning mixing air duct 75 channel 42 to direct generally axially the air 17 to area 83 adjacent to transition shell 74 as a secondary f/a premixing means. The annular transition forms 48 and 49 can have varying annular areas to allow transition of combustor gas to different turbine nozzle locations including one further radially inboard of the secondary zone, inboard of the primary combustion zone. The secondary air flow 52 FIG. 3 can be directed in an axial discharge direction or with an angle circumferentially 52A governed in part by angle positioning vanes 42. The secondary air flow 52A into the secondary of an upstream regulation detail 51, FIG. 4 with retainer means 84 and further enhance cooling of the toroidal liner section by use of flow holes in the plate 51 in close proximity to shell 66A impinge air as it enters the flow transient duct 75.

In summary the aforementioned RQL combustor invention, heat energy device, receives air or oxidant and fuel, stage premixes a combustible F/A mixture and retains a combustion flame; and is generally for use in gas turbine engines to drive a turbine. The engine body having a compressor inlet connected to the compressor housing with a compressor rotor having rotating blades is internal to the engine body with fluid communication with the combustor and the turbine and the turbine rotor having blades has a common spool connection with the compressor. Fuel injectors with a controlled supplied fuel pressure deliver fuel to the premix chambers located internally to the rich F/A a primary combustion zone; and attached to the toroidal primary combustor chamber outer shell and positioned tangentially having geometry-length to induce a circumferential combustion flow.

Within the primary combustor chamber an igniter is positioned to ignite the primary chamber delivered premixed combustible mixture from the F/A premix chambers. Also, a separate torch supply f/a mixture system could be used to start the combustion process, where at a defined engine speed the f/a mixture from the premix chambers could be switched to the main fuel premix primary F/A system. The combusted rich fuel-air mixture is supplied to the radially inboard positioned toroidal geometry shell form, and the outboard of the secondary combustion zone combustor and between the two combustor zones a reduced axial section of axial annular secondary outer liner section receives a secondary air supply to yield a lean secondary f/a combustible mixture. A flame temperature of ~2500 F is ideal for low NOx and CO simultaneously. NOx although tested low in this device, like other combustor devices, is a summing species collective from the primary zone and secondary zone. The CO specie with reduced flame temperature below 2500 F requires increased residence time to allow conversion to CO2 for complete combustion. A dilution zone is downstream of the secondary combustion section with correspondingly further compressor supply air in transit to the dilution holes is a liner cooling mean. The dilution zone is connected to the turbine nozzle downstream of the secondary zone to create the desired gas temperature to drive the bladed turbine rotor. The secondary air supply for the quick quench premixing area 83 process with the supplied primary fuel rich combustion gases 83 can be injected with continuous non disruptive flow geometry from an axial supply or in combination with an externally radial channel induced downstream supply; also but not shown in previous figures can be secondary mixing air could be injected axially from two opposing axial displaced circumferential air annulus forms with channel flow. The secondary combustion gases can be ducted axially left, right or radially inboard to the dilution zone and subsequent turbine nozzle and turbine rotor locations.

As to a further discussion of the manner of usage and operation of the present invention, the same should be apparent from the above description. Accordingly, no further discussion relating to the manner of usage and operation will be provided. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Thus, disclosed are novel fuel/air premixing chambers that are applied to a gas turbine combustor RQL or LPP type integrated to the combustor with extension into the combustion zone. An integral heat exchange structure cools the premix chamber outer wall, preheating the compressor air supply as it passes into an inner central longitudinal premix tube preheating also the fuel and F/A mixture for improved mixedness, low emissions combustion and low differential combustor pressure. The F/A premix flow thru the central longitudinal tubes yields an exiting spouting velocity into the primary combustion zone for swirl/circumferential flow combustion yielding flame stability. Circumferentially close spaced premixing chambers about the combustor outer wall, are tangentially positioned for internal combustion hot gas flow, preheating the adjacent premix chamber and generates internal sweeping hot gas flow preventing combustion chamber carbon issues. Incorporates low pressure fuel injection into a central longitudinal tube for reduced cost and system simplicity.

Therefore, the foregoing is considered as illustrative only of the principles of the invention. Further, since numerous modifications and changes will readily occur to those skilled the art, it is not desired to limit the invention to the exact construction and 5 operation shown and described, and accordingly, all suitable modifications and equivalents may be resorted to, falling within the scope of the invention.

What is claimed:

1. A combustion chamber of a radially staged rich burn-quick quench-lean burn (RQL) combustor, comprising:
    a shell defining a combustion zone;
    a fuel air premix chamber attached within the combustion chamber;
    wherein the fuel air premix chamber includes an elongated tubular body member, the elongated tubular body member has an internal passageway extending from a first end to a second end with the second end of the passageway open, the body member having an inner wall and an outer wall which define an area between the inner wall and the outer wall, the body member having a mid wall disposed between the inner wall and the outer wall to create a U-shaped passageway in the area, a first outer end of the U-shaped passageway in communication with a supply of air and a second inner end of the U-shaped passageway in communication with the internal passageway for delivering air into the internal passageway, an inner surface of the outer wall has a plurality elongated cooling fins disposed thereon; and
    an injector having an outer discharge end disposed within the internal passageway at the first end of the internal passageway for injecting fuel or gas within the internal passageway at the first end of the internal passageway;
    wherein the inner wall having a first plurality of air supply cross openings at or near the first end of the internal passageway to provide communication between the internal passageway and the U-shaped passageway to allow heated air traveling through the U-shaped passageway to enter into the internal passageway for mixing with the fuel or gas injected into the internal passageway;
    wherein the mixture of air and fuel or gas is delivered into the combustion chamber in at least a partly tangential direction relative to a longitudinal axis of the combustor;
    wherein the first end of the internal passageway is fully disposed within the shell.

2. The combustion chamber of claim 1 wherein a fuel/air mixture discharge exiting flow velocity at the second end of the internal passageway is greater than a resultant flame speed.

3. The combustion chamber of claim 1 wherein the inner wall having a second plurality of air supply cross openings at or near the second end of the internal passageway to provide communication between the internal passageway and the U-shaped passageway to allow heated air traveling through the U-shaped passageway to enter into the internal passageway for mixing with the fuel or gas injected into the internal passageway.

4. The combustion chamber of claim 1 further comprising an end cap at the first end of the internal passageway such that the first end of the internal passageway is closed.

5. The combustion chamber of claim 1 wherein the first outer end of the U-shaped passageway and the second inner end of the U-shaped passageway are disposed near or at the first end of the internal passageway.

6. The combustion chamber of claim 1 wherein the disposal of the elongated tubular body member within the combustion chamber causes the outer surface of the body member during use to be heated from a flame generated within the chamber which causes the air within the U-shaped passageway to be preheated.

7. The combustion chamber of claim 1 wherein the internal passageway has a same or substantially same diameter from the first end of the internal passageway to the second end of the internal passageway.

8. The combustion chamber of claim 1 wherein the outer discharge end of the injector is disposed between the first end of the internal passageway and the first plurality of air supply cross openings.

9. The combustion chamber of claim 1 wherein an inner surface of the internal passageway is constructed from a ceramic material.

10. A combustion chamber of a radially staged rich burn-quick quench-lean burn (RQL) combustor, comprising:
    a shell defining a combustion zone;
    a fuel air premix chamber attached within the combustion chamber;
    wherein the fuel air premix chamber includes an elongated tubular body member, the elongated tubular body member has an internal passageway extending from a first end to a second end with the second end of the passageway open, the internal passageway has a same or substantially same diameter from the first end of the internal passageway to the second end of the internal passageway, the body member having an inner wall and an outer wall which define an area between the inner wall and the outer wall, the body member having a mid wall disposed between the inner wall and the outer wall to create a U-shaped passageway in the area, a first outer end of the U-shaped passageway in communication with a supply of air and a second inner end of the U-shaped passageway in communication with the internal passageway for delivering air into the internal passageway, the first outer end of the U-shaped passageway and the second inner end of the U-shaped passageway are disposed near or at the first end of the internal passageway, an inner surface of the outer wall has a plurality elongated cooling fins disposed thereon; and an injector having an outer discharge end disposed within the internal passageway at the first end of the internal passageway for injecting fuel or gas within the internal passageway at the first end of the internal passageway;

wherein the inner wall having a first plurality of air supply cross openings at or near the first end of the internal passageway to provide communication between the internal passageway and the U-shaped passageway to allow heated air traveling through the U-shaped passageway to enter into the internal passageway for mixing with the fuel or gas injected into the internal passageway;

wherein the inner wall having a second plurality of air supply cross openings at or near the second end of the internal passageway to provide communication between the internal passageway and the U-shaped passageway to allow heated air traveling through the U-shaped passageway to enter into the internal passageway for mixing with the fuel or gas injected into the internal passageway;

wherein the disposal of the elongated tubular body member within the combustion chamber causes the outer surface of the body member during use to be heated from a flame generated within the chamber which causes the air within the U-shaped passageway to be preheated;

wherein the mixture of air and fuel or gas is delivered into the combustion chamber in at least a partly tangential direction relative to a longitudinal axis of the combustor;

wherein the first end of the internal passageway is fully disposed within the shell.

11. The combustion chamber of claim 10 further comprising an end cap at the first end of the internal passageway such that the first end of the internal passageway is closed.

12. The combustion chamber of claim 10 wherein the outer discharge end of the injector is disposed between the first end of the internal passageway and the first plurality of air supply cross openings.

13. The combustion chamber of claim 10 wherein an inner surface of the internal passageway is constructed from a ceramic material.

14. A combustion chamber of a radially staged rich burn-quick quench-lean burn (RQL) combustor, comprising:
a shell defining a combustion zone;
a fuel air premix chamber attached within the combustion chamber;
wherein the fuel air premix chamber includes an elongated tubular body member, the elongated tubular body member is fully disposed within the primary combustion chamber, the elongated tubular body member has an internal passageway extending from a first end to a second end with the second end of the passageway open, the internal passageway has a same or substantially same diameter from the first end of the internal passageway to the second end of the internal passageway, the body member having an inner wall and an outer wall which define an area between the inner wall and the outer wall, the body member having a mid wall disposed between the inner wall and the outer wall to create a U-shaped passageway in the area, a first outer end of the U-shaped passageway in communication with a supply of air and a second inner end of the U-shaped passageway in communication with the internal passageway for delivering air into the internal passageway, the first outer end of the U-shaped passageway and the second inner end of the U-shaped passageway are disposed near or at the first end of the internal passageway, an inner surface of the outer wall has a plurality elongated cooling fins disposed thereon; and an injector having an outer discharge end disposed within the internal passageway at the first end of the internal passageway for injecting fuel or gas within the internal passageway at the first end of the internal passageway;

wherein the inner wall having a first plurality of air supply cross openings at or near the first end of the internal passageway to provide communication between the internal passageway and the U-shaped passageway to allow heated air traveling through the U-shaped passageway to enter into the internal passageway for mixing with the fuel or gas injected into the internal passageway;

wherein the inner wall having a second plurality of air supply cross openings at or near the second end of the internal passageway to provide communication between the internal passageway and the U-shaped passageway to allow heated air traveling through the U-shaped passageway to enter into the internal passageway for mixing with the fuel or gas injected into the internal passageway;

wherein the outer discharge end of the injector is disposed between the first end of the internal passageway and the first plurality of air supply cross openings;

wherein the disposal of the elongated tubular body member within the combustion chamber causes the outer surface of the body member during use to be heated from a flame generated within the chamber which causes the air within the U-shaped passageway to be preheated;

wherein the mixture of air and fuel or gas is delivered into the combustion chamber in at least a partly tangential direction relative to a longitudinal axis of the combustor;

wherein the first end of the internal passageway is fully disposed within the shell.

15. The combustion chamber of claim 14 further comprising an end cap at the first end of the internal passageway such that the first end of the internal passageway is closed.

16. The combustion chamber of claim 14 wherein an inner surface of the internal passageway is constructed from a ceramic material.

* * * * *